(No Model.)
G. W. SIMMONS.
RUNNING GEAR FOR VEHICLES.
No. 320,303. Patented June 16, 1885.
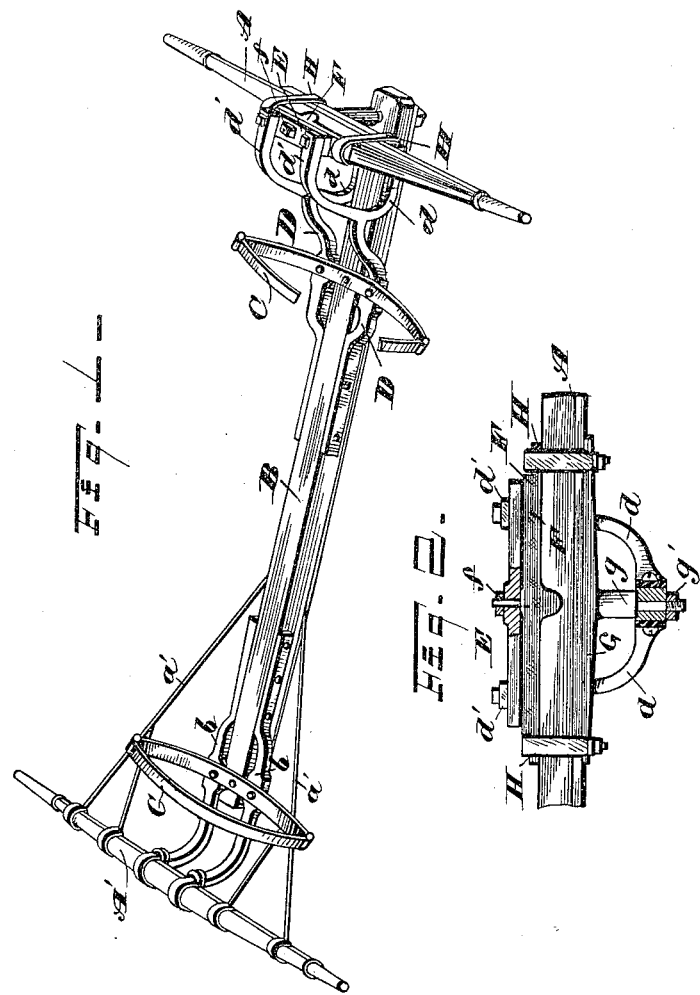
WITNESSES
INVENTOR
Geo. W. Simmons
by
Leggett & Leggett
Attorneys

UNITED STATES PATENT OFFICE.

GEORGE W. SIMMONS, OF VERNON, OHIO.

RUNNING-GEAR FOR VEHICLES.

SPECIFICATION forming part of Letters Patent No. 320,303, dated June 16, 1885.

Application filed December 10, 1884. (No model.)

*To all whom it may concern:*

Be it known that I, GEORGE W. SIMMONS, of Vernon, in the county of Trumbull and State of Ohio, have invented certain new and useful Improvements in Running-Gears for Vehicles; and I do hereby declare the following to be a full, clear, and exact description of the invention, such as will enable others skilled in the art to which it pertains to make and use the same.

My invention relates to improvements in running-gears for vehicles; and it consists in certain features of construction, and in combination of parts hereinafter described, and pointed out in the claims.

In the accompanying drawings, Figure 1 is a view in perspective of a portion of the running-gear of a vehicle embodying my invention. Fig. 2 is a front elevation of the same, partly in section.

A represents the forward axle; A', the rear axle; B, the reach, and C the springs. The reach is depressed below the line of the axles, and the springs are secured to the reach and attachments, to the end that the vehicle-body may be correspondingly depressed. The rear portion of the reach is provided with extension rods or arms $b$, secured on either side, as shown, and diverging from the reach far enough to form a seat suitably broad for the attachment of the rear spring. Back of the spring the rods $b$ curve upward, more or less, according to the depression of the reach, and are secured to the axle A', preferably with clips $a$. Ordinary braces, $a'$, are also provided, and are secured in the usual manner.

D are side arms or braces, the rear ends of which are respectively secured on either side of the reach, as shown, and diverge from the reach and form a broad seat for the forward spring, similar to the seat for the rear spring just described. The forward ends of the parts D are forked, and the respective lower prongs, $d$, converge until they join the reach, along which they extend to the front end and are secured thereto. The upper prongs, $d'$, curve upward and forward, and are secured on top to the respective ends of the plate E.

F and G are plates secured, respectively, above and below to the axle A, preferably by the clips H. The plate F has a bolt, $f$, in the central part, extending upward through a hole in the plate E, and forms a pivotal center for this plate. The plate G has a depending lug, $g$, the lower end of which is reduced in size, and passes in the form of a bolt through the reach, and is secured below by a nut, $g'$. The parts $f$ and $g$ are in line, and form or take the place of a king-bolt, and the plates E and F perform the functions of the ordinary fifth-wheel. The respective prongs $d$ and $d'$ of the arms D, separated a considerable distance at the ends and secured to the parts, as shown, give firm support to the axle A and attachments. With this construction the ordinary "spring-bars," "body-loops," and "head-block" are dispensed with, by reason of which a considerable reduction in the initial cost is had.

In addition to the facility for depressing the carriage-body that is had with this construction, the elasticity of the reach greatly relieves the axles in case of sudden and heavy strain—as, for instance, when obstructions or deep holes and ruts in the road-bed are encountered; and the springs, being some distance from the respective axles, are proportionately less affected by the rise or fall of the axles.

I am aware that reaches have been depressed below the line of the axles and springs have been attached to the same, and I do not claim, broadly, such construction.

What I claim is—

1. In running-gears for vehicles, the combination, with a reach depressed below the line of the axles, of rods or arms connecting the reach with the axles or attachments, and diverging from the reach, so as to form broad seats for the springs, substantially as set forth.

2. In running-gears for vehicles, the combination, with a reach depressed below the line of the axles, of the arms D, with portions separated from the reach to support the spring, and with forked ends secured, respectively, to the reach below the axle and to the plate E, substantially as set forth.

3. In running-gears for vehicles, the plates F and G, secured, respectively, above and below the axle, and provided with the pivots or bolts $f$ and $g$, of the reach B, the forked arms D, and the plate E, substantially as set forth.

In testimony whereof I sign this specification, in the presence of two witnesses, this 19th day of November, 1884.

GEORGE W. SIMMONS.

Witnesses:
JAS. K. BUELL,
C. E. REED.